Patented Mar. 4, 1930

1,749,608

UNITED STATES PATENT OFFICE

REED P. ROSE, OF JACKSON HEIGHTS, AND HAROLD E. CUDE, OF FLORAL PARK, NEW YORK, ASSIGNORS TO THE NAUGATUCK CHEMICAL COMPANY, OF NAUGATUCK, CONNECTICUT, A CORPORATION OF CONNECTICUT

METHOD OF DISPERSING RUBBER

No Drawing. Application filed August 20, 1927. Serial No. 214,452.

This invention relates to the preparation of dispersions of rubber in oil emulsions containing water as the continuous phases. The invention comprises forming an emulsion of the oil in water type and dispersing rubber in the emulsion.

As one example of an emulsion, 100 parts of spindle oil are emulsified in 2 parts of water containing 5 parts of alkaline sulphonated castor oil. The sulphonated castor oil may be mixed with the water and the spindle oil may then be stirred into the mixture. This type of emulsion known as the oil in water type is easy to prepare and is extremely stable. Reclaimed rubber may be dispersed directly in this emulsion by agitating in a mixing machine such as an enclosed mixer. 500 parts by weight of reclaimed rubber and 250 parts by weight of the oil-in-water emulsion above described may be placed in a closed mixer and worked therein for an hour at 70° C. After this is done 500 parts of water may be introduced and the mixing continued until a smooth creamy product is obtained. This artificial latex or paste may be diluted as desired and will be found quite stable against mechanical treatments.

The proportions above given are not rigid. The oil in water emulsion, for example, may be varied as to oil content and as to water content without changing the character of the emulsion. The ratio of reclaimed rubber to oil emulsion may be varied. In the above example the proportion is two to one, but it may also be four to one or even greater, although it will be found that as the proportion of rubber is increased a longer time will be required to effect the dispersion of the rubber in the emulsion. Time and temperature are not fixed, but may be varied to suit the practical considerations of manufacture. It is of course understood that the temperature must not be so high as to affect the stability of the oil emulsion. Temperatures lying within the usual mixing operations as carried out in the rubber industry are entirely satisfactory.

Instead of the spindle oil mentioned above, the invention may be carried out with other mineral oils or with vegetable oils or with other hydrocarbons which are insoluble in water and can be emulsified therein to form stable pastes or salves. For example cotton seed oil and other seed oils, solid or semi-liquid fatty acids, paraffines, vegetable waxes, etc. may be employed in making up the emulsion. Other dispersing agents or protective colloids may be employed provided they are of the type which form oil in water emulsions.

The product of this invention may be utilized directly, with or without dilution, in a great number of the manufacturing processes in which natural rubber latex is used. The product may also be employed as a compounding ingredient in natural rubber latex. It is suitable for instance in the manufacture of paper products containing rubber, for the product may be introduced into the beater and coagulated upon the paper making fibre in the same general way that natural rubber latex has been deposited upon paper fibres. The product has a grease-like appearance and feeling, particularly when it is in paste form.

Having thus described our invention, what we claim and desire to protect by Letters Patent is:

1. A method of manufacturing aqueous dispersions of rubber which comprises forming an emulsion of spindle oil in water containing alkaline sulphonated castor oil, and mixing reclaimed rubber with said emulsion until the rubber becomes dispersed therein.

2. A method of manufacturing aqueous dispersions of rubber which comprises making an emulsion of spindle oil in a small amount of water containing a hydrophylic protective colloid, incorporating reclaimed rubber with said emulsion in a mixing apparatus, and subjecting the contents of the apparatus to mastication to disperse the rubber in the emulsion, and introducing a further quantity of water to form a fluid dispersion.

Signed at New York, county and State of New York, this 15th day of August, 1927.

REED P. ROSE.

Signed at New York, county and State of New York, this 15th day of August, 1927.

HAROLD E. CUDE.